US008469256B2

(12) United States Patent
Babb et al.

(10) Patent No.: US 8,469,256 B2
(45) Date of Patent: Jun. 25, 2013

(54) METHOD FOR USING A NON-LINEAR CONTROL PARAMETER RAMP PROFILE TO APPROACH A TEMPERATURE SET POINT OF A TOOL OR WELD THAT PREVENTS TEMPERATURE OVERSHOOT DURING FRICTION STIR WELDING (75) Inventors: Jonathan A. Babb, West Jordan, UT (US); Russell J. Steel, Salem, UT (US); Scott M. Packer, Alpine, UT (US); John Williams, Alpine, UT (US)

(73) Assignee: MegaStir Technologies LLC, Provo, UT (US)

( * ) Notice: Subject to any disclaimer, the term of this patent is extended or adjusted under 35 U.S.C. 154(b) by 0 days.

(21) Appl. No.: 13/324,855

(22) Filed: Dec. 13, 2011

(65) Prior Publication Data
US 2012/0185075 A1  Jul. 19, 2012

Related U.S. Application Data (63) Continuation-in-part of application No. 13/052,997, filed on Mar. 21, 2011, now abandoned, which is a continuation of application No. 12/539,595, filed on Aug. 11, 2009, now Pat. No. 7,909,231.

(60) Provisional application No. 61/088,001, filed on Aug. 11, 2008.

(51) Int. Cl.
*B23K 31/02* (2006.01)
*B23K 20/12* (2006.01)

(52) U.S. Cl.
USPC .................. 228/112.1; 228/2.1; 228/102

(58) Field of Classification Search
USPC ............... 228/2.1, 112.1, 102, 103; 700/145, 700/153
See application file for complete search history.

(56) References Cited

U.S. PATENT DOCUMENTS

| 5,156,316 | A | 10/1992 | Nied et al. |
| 7,404,670 | B2 | 7/2008 | Willis |
| 2005/0006438 | A1 | 1/2005 | Andersson et al. |
| 2005/0035173 | A1 | 2/2005 | Steel et al. |
| 2006/0065698 | A1 | 3/2006 | Ishikawa et al. |
| 2008/0083817 | A1 | 4/2008 | Baumann et al. |
| 2009/0255980 | A1 * | 10/2009 | Li et al. .................... 228/102 |

FOREIGN PATENT DOCUMENTS

JP  2011115842 A  *  6/2011

* cited by examiner

*Primary Examiner* — Devang R Patel
(74) *Attorney, Agent, or Firm* — Morriss O'Bryant Compagni, PC (57) ABSTRACT A control parameter ramp profile that enables control parameters to be modified in a non-linear manner, such that as a temperature set point of a tool or a weld is approached, the control parameter ramp profile enables the temperature set point to be approached in a manner that prevents temperature overshoot and therefore creating a better weld along the length thereof, wherein the control parameter ramp profile includes but is not limited to proportional, exponential or an S-curve waveform.

14 Claims, 5 Drawing Sheets

METHOD FOR USING A NON-LINEAR CONTROL PARAMETER RAMP PROFILE TO APPROACH A TEMPERATURE SET POINT OF A TOOL OR WELD THAT PREVENTS TEMPERATURE OVERSHOOT DURING FRICTION STIR WELDING

RELATED APPLICATIONS

This application claims priority to and incorporates by reference all of the subject matter of U.S. Provisional Application Ser. No. 61/088,001, filed Aug. 11, 2008, U.S. Non-Provisional patent application Ser. No. 12/539,595, filed Aug. 11, 2009 and now issued as U.S. Pat. No. 7,909,231 B2, and Continuation U.S. patent application Ser. No. 13/052,997, filed Mar. 21, 2011.

BACKGROUND OF THE INVENTION

Field of the Invention

This invention relates generally to friction stir welding (FSW) and all of its variations including friction stir processing (FSP), friction stir mixing (FSM) and friction stir spot welding (FSSW) (and hereinafter referred to collectively as "friction stir welding"). Specifically, the invention relates to the problems that are unique to friction stir welding of high temperature materials. The controls and process criteria for friction stir welding of low temperature materials such as aluminum are insufficient to manage the critical and dynamic process around a tool during friction stir welding of high melting temperature materials.

Background of the Problems Being Solved

Friction stir welding is a technology that has been developed for welding metals and metal alloys. The FSW process often involves engaging the material of two adjoining workpieces on either side of a joint by a rotating stir pin. Force is exerted to urge the pin and the workpieces together and frictional heating caused by the interaction between the pin, shoulder and the workpieces results in plasticization of the material on either side of the joint. The pin and shoulder combination or "FSW tip" is traversed along the joint, plasticizing material as it advances, and the plasticized material left in the wake of the advancing FSW tip cools to form a weld. The FSW tip can also be a tool without a pin but only a shoulder for processing of another material through FSP.

Figure 1:
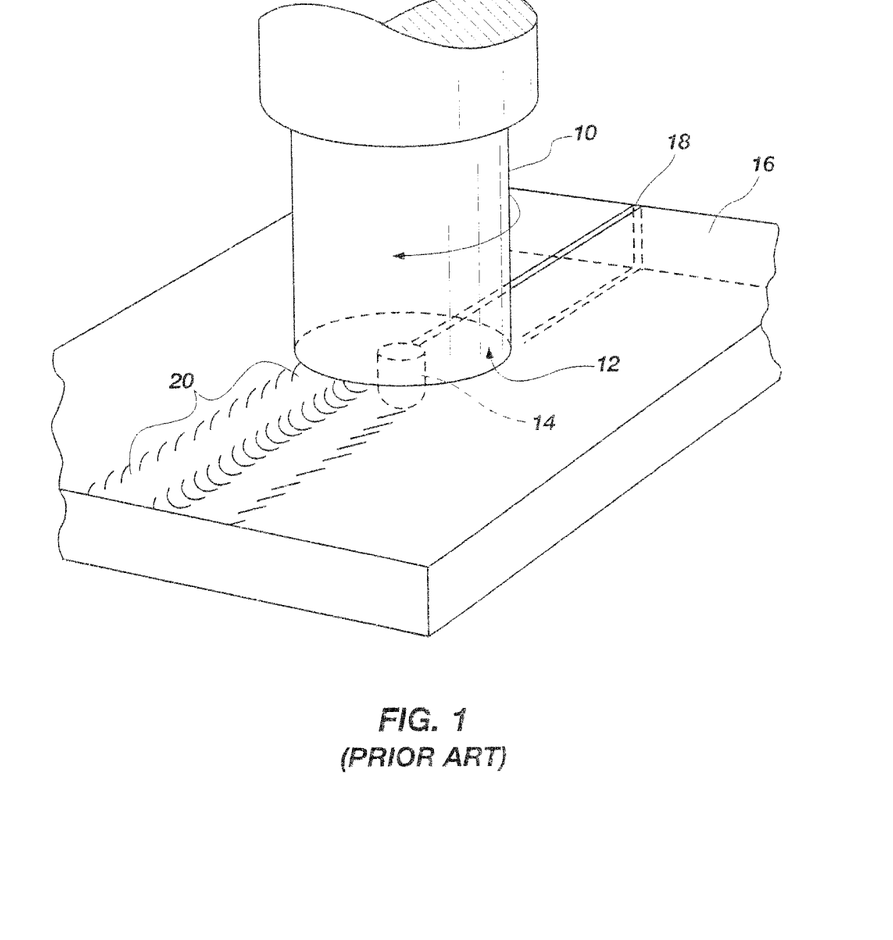
FIG. 1 is a perspective view of a tool as taught in the prior art for friction stir welding.

FIG. 1 is a perspective view of a tool being used for friction stir welding that is characterized by a generally cylindrical tool 10 having a shank 8, a shoulder 12 and a pin 14 extending outward from the shoulder. The pin 14 is rotated against a workpiece 16 until sufficient heat is generated, at which point the pin of the tool is plunged into the plasticized workpiece material. Typically, the pin 14 is plunged into the workpiece 16 until reaching the shoulder 12 which prevents further penetration into the workpiece. The workpiece 16 is often two sheets or plates of material that are butted together at a joint line 18. In this example, the pin 14 is plunged into the workpiece 16 at the joint line 18.

Figure 2:
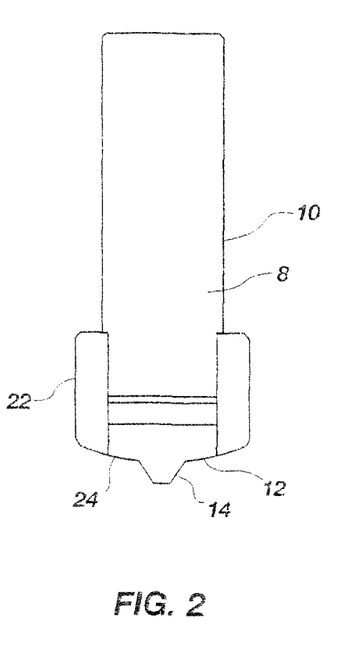
FIG. 2 is a cut-away profile view of an FSW tip, a locking collar and a shank from the prior art.

FIG. 2 is a cross-sectional view of the tool 10. A collar 22 is shown gripping both the shank 8 and the FSW tip 24, wherein the FSW tip is comprised of the shoulder 12 and the pin 14. As the tool 10 is rotated, torque is transmitted from the rotating shank 8 to the collar 22 and then to the FSW tip 24. When the tool 10 is being used on a workpiece that is a high melting temperature material such as steel, the FSW tip 24 is in many situations exposed to temperatures in excess of 1000 degrees C. as it is rotated while traversing steel softened by frictional heating.

Referring to FIG. 1, the frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin 14 from a leading edge to a trailing edge. The result is a solid phase bond 20 at the joint line 18 that may be generally indistinguishable from the workpiece material 16 itself, in contrast to welds using other conventional technologies. It is also possible that the solid phase bond 20 is superior to the original workpiece material 16 because of the mixing that occurs. Furthermore, if the workpiece material is comprised of different materials, the resulting mixed material may also be superior to either of the two original workpiece materials.

It is observed that when the shoulder 12 contacts the surface of the workpieces, its rotation creates additional frictional heat that plasticizes a larger cylindrical column of material around the inserted pin 14. The shoulder 12 provides a forging force that contains the upward metal flow caused by the rotating tool pin 14.

During friction stir welding, the area to be welded and the tool 10 are moved relative to each other such that the tool traverses a desired length of the weld joint. The rotating friction stir welding tool 10 provides a continual hot working action, plasticizing metal within a narrow zone as it moves transversely along the workpiece materials 16, while transporting metal from the leading edge of the pin 14 to its trailing edge. As a weld zone cools, there is typically no solidification as no liquid is created as the tool 10 passes. It is often the case, but not always, that the resulting weld is a defect-free, recrystallized, fine grain microstructure formed in the area of the weld.

Travel speeds are typically 10 to 500 mm/min with rotation rates of 200 to 2000 rpm. Temperatures reached are usually close to, but below, solidus temperatures. Friction stir welding parameters are a function of a material's thermal properties, high temperature flow stress and penetration depth.

Friction stir welding has several advantages over fusion welding because 1) there is no filler metal, 2) the process can be fully automated requiring a relatively low operator skill level, 3) the energy input is efficient as all heating occurs at the tool/workpiece interface, 4) minimum post-weld inspection is required due to the solid state nature and extreme repeatability of FSW, 5) FSW is tolerant to interface gaps and as such little pre-weld preparation is required, 6) there is typically no weld spatter to remove, 7) the post-weld surface finish can be exceptionally smooth with very little to no flash, 8) there is often no porosity and oxygen contamination, 9) there is little or no distortion of surrounding material, 10) no operator protection is required as there are no harmful emissions, and 11) weld properties are often improved. Throughout this document, friction stir welding will be considered to include all processes that can be performed using a friction stir welding tool, including but not limited to friction stir processing, friction stir spot welding and friction stir mixing.

Previous patent documents have taught the benefits of being able to perform friction stir welding with materials that were previously considered to be functionally unweldable. Some of these materials are non-fusion weldable, or just difficult to weld at all. These materials include, for example, metal matrix composites, ferrous alloys such as steel and stainless steel and non-ferrous materials. Another class of materials that were also able to take advantage of friction stir welding is the superalloys. Superalloys can be materials having a higher melting temperature bronze or aluminum, and may have other elements mixed in as well. Some examples of superalloys are nickel, iron-nickel, and cobalt-based alloys generally used at temperatures above 1000 degrees F. Additional elements commonly found in superalloys include, but are not limited to, chromium, molybdenum, tungsten, aluminum, titanium, niobium, tantalum, and rhenium.

It is noted that titanium is also a desirable material to friction stir weld. Titanium is a non-ferrous material, but has a higher melting point than other nonferrous materials.

The previous patents teach that a tool for friction stir welding of high temperature materials is made of a material or materials that have a higher melting temperature than the material being friction stir welded. In some embodiments, a superabrasive was used in the tool, sometimes as a coating.

The embodiments of the present invention are generally concerned with these functionally unweldable materials, as well as the superalloys, and are hereinafter referred to as "high melting temperature" materials throughout this document. Nevertheless, the tool to be taught herein can also be used in less harsh friction stir welding environments when low melting temperature materials are being used.

The present invention is useful for tools being used in many applications, but most especially when performing friction stir processing of high melting temperature materials.

High Temperature Friction Stir Welding Tool

In conjunction with the problems associated with the creation of materials that require liquid to solid phase transformation, recent advancements in friction stir welding technologies have resulted in tools that can be used to join high melting temperature materials such as steel and stainless steel together during the solid state joining processes of friction stir welding.

When this tool is used it is effective at friction stir welding of various materials. This tool design is also effective when using a variety of tool tip materials besides polycrystalline cubic boron nitride (PCBN) and polycrystalline diamond (PCD). Some of these materials include refractories such as tungsten, rhenium, iridium, titanium, molybdenum, etc.

As explained previously, friction stir welding is a solid state joining process that uses a rotating tool to generate frictional heat as the tool traverses a joint line between two metal bodies positioned adjacent to each other. This method for joining provides a superior joint over fusion welding processes that melt and solidify the bodies being joined. FSW is now used to commercially join materials in a variety of industries which include shipbuilding, oil and gas, and aerospace.

The friction stir welding equipment used to join high melting temperature materials has two predominant control parameters; axial or Z axis load, and axial or Z axis position. These two control parameters are used along with tool traverse speed and tool rotational speed during the FSW process to produce a friction stir welded joint. Generally, all four of these control parameters (Z axis load, Z axis position, tool traverse speed, and tool rotational speed) are independent of each other and are controlled by closed loop feedback algorithms programmed to a specified set point for each control parameter. Most of the applications in FSW production at this time are comprised of aluminum friction stir welded components where operator intervention is often required during the production FSW process. In most aluminum applications, FSW is a more forgiving process where the flow and ductility of aluminum are high and the heat generated during the FSW process is quickly transferred away from the tool path because of aluminum's high thermal conductivity.

As FSW is progressing into high strength, high melting temperature materials applications, the process window to create a defect-free reliable welding joint is much smaller than with aluminum. This smaller process window is due to steeper temperature gradients around the tool, relatively low thermal conductivity of the materials being joined, high flow stresses, and/or lower material ductility.

The steeper temperature gradients are a result of low material thermal conductivity combined with higher temperatures that are required to plasticize material flow around the tool. In aluminum, heat transfer is predominantly through the material while in high melting temperature materials such as steel, the heat flows through the material, the back side of the material, is reflected internally from surfaces and interfaces and through the tool. In addition, the thermal and mechanical loads applied to the tool during FSW are extreme, and precision process control is required to not only prevent tool failure by wear or breakage, but to also create predictable and consistent joint properties. The controls and process criteria for FSW low temperature materials such as aluminum are insufficient to manage the critical and dynamic process around the tool during FSW of high melting temperature materials.

It would be an advantage over the prior art to create a system for managing the control parameters and dynamic processes of friction stir welding of high melting temperature materials to thereby improve tool life and the quality of the weld.

BRIEF SUMMARY OF THE INVENTION

It is an aspect of the present invention to provide a new control variable that is combined with dependent control criteria on other variables.

In one embodiment of the present invention, a control parameter ramp profile is introduced that enables control parameters to be modified in a non-linear manner, such that as a temperature set point of a tool or a weld is approached, the control parameter ramp profile enables the temperature set point to be approached in a manner that prevents temperature overshoot and therefore creating a better weld along the length thereof, wherein the control parameter ramp profile includes but is not limited to proportional, exponential or an S-curve waveform.

These and other aspects, features, advantages of the present invention will become apparent to those skilled in the art from a consideration of the following detailed description taken in combination with the accompanying drawings.

DETAILED DESCRIPTION OF THE INVENTION

Reference will now be made to the drawings in which the various elements of embodiments of the present invention will be given numerical designations and in which the invention will be discussed so as to enable one skilled in the art to make and use the embodiments. It is to be understood that the following description is only exemplary of the principles of the present invention, and should not be viewed as narrowing the claims which follow.

In a first embodiment, the present invention is designed to produce a superior weld and improved tool life when friction stir welding materials that have melting temperatures higher than bronze and aluminum as previously disclosed. This class of materials includes, but is not limited to, metal matrix composites, ferrous alloys such as steel and stainless steel, non-ferrous materials, superalloys, titanium, cobalt alloys typically used for hard-facing, and air-hardened or high speed steels.

Figure 3:
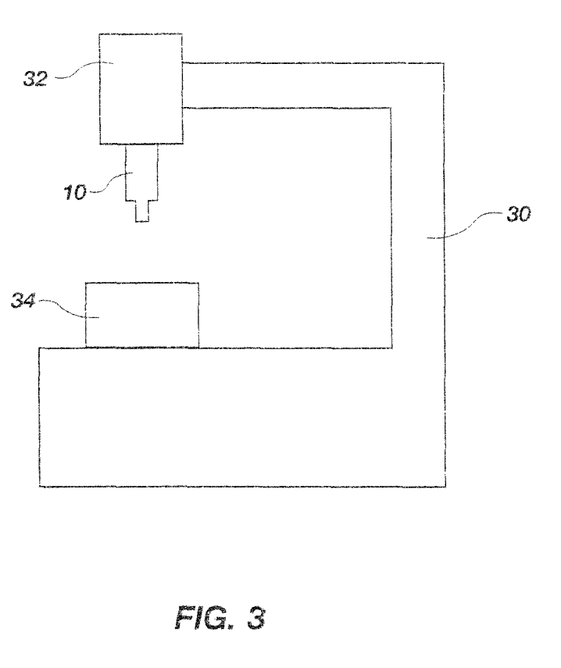
FIG. 3 is a schematic diagram of the components of a friction stir welding machine.

The present invention consists of the addition of a new control variable that is combined with dependent control criteria on other variables. To understand how the present invention operates, it is useful to show a simplified diagram of the components of a friction stir welding machine. A friction stir welding machine is typically comprised of a frame 30, a tool holder 32 coupled to the frame, and a table 34 disposed under the tool holder for supporting workpiece materials. A friction stir welding tool 10 is disposed in the tool holder 32. The tool holder 32 maneuvers the tool 10 into the desired position and applies the rotational speed to the tool that enables the tool to be plunged into the workpiece materials. The tool holder 32 and the table 34 provide the ability for the tool 10 to be forced against the workpiece materials that is mounted on the table 34.

The tool holder 32 and the table 34 operate under the direction of a control program that is used to operate the friction stir welding machine. Ideally, the control program can perform friction stir welding with minimal or no operator intervention. Accordingly, the friction stir welding process was analyzed in order to determine what output variable could be monitored and used as feedback to the control program in order for the control program to make adjustments that would enable the machine to operate with minimal user intervention. These adjustments were made in order to produce a superior weld, to produce a weld that is repeatable and to maximize tool life.

It was determined that tool temperature could be monitored as an output variable to determine when a steady state process was being achieved. In this case, a steady state process is one in which the friction stir welding tool is performing a weld while maintaining a constant or near-constant temperature, hereinafter called the temperature set point of the tool 10.

The temperature set point of the tool 34 can be monitored in many ways that are known to those skilled in the art. For example, a temperature thermocouple can be disposed within the tool 10. The method of determining the temperature is not an aspect of the present invention, but will be assumed is being determined correctly and in real-time.

Tool temperature has a direct bearing upon all of the desired objectives of the present invention. Tool temperature relates directly to loads on the tool, defects in the joint, and flow stresses in the workpiece materials being joined. Friction stir welding is unique in its ability to provide real-time temperatures during the welding process.

A computer control program is used for controlling the operation of the friction stir welding machine. The control program utilizes nested control loops based on the desired tool temperature set point. In other words, by creating nested control loops in the control program, the control program modifies a control parameter until that control parameter cannot be modified anymore. For example, the control program reaches a value for the control parameter that is not supposed to be exceeded. Thus, when a control parameter can no longer be adjusted, the control program will move to a next control parameter that can still be modified. The control program then makes adjustments to the control parameter to again try and bring the tool temperature set point to a desired value. If modifying this new control parameter is successful, then the control program does not move to a different control parameter. If unsuccessful, the control program modifies the control parameter until reaching another control parameter boundary.

This process of moving from control parameter to control parameter continues as long as there are control parameters that have not been adjusted until reaching a control parameter boundary, the tool temperature set point is finally reached, or the system fails to reach the desired tool temperature set point. The control program therefore utilizes nested control loops, each loop representing a different control parameter.

Figure 4:
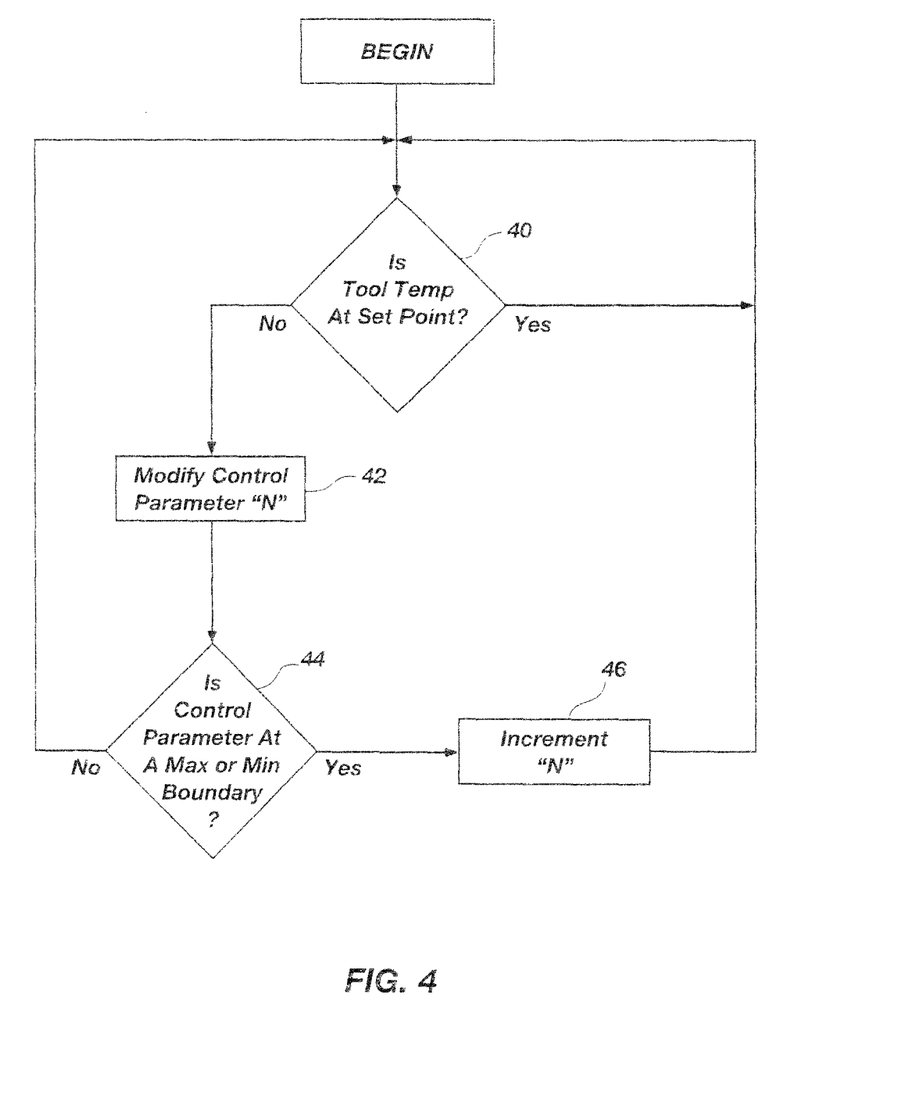
FIG. 4 is a flowchart of a method for controlling a friction stir welding process by using nested control loops that try and maintain the assigned value of a control variable.

FIG. 4 is provided as a summary of the process to be followed by the control program when a single control parameter can be modified at any given time. After beginning, the control program determines if the tool is at the desired set point temperature in item 40. If it is, the control program loops back to the same step and continues to query the friction stir welding machine if the tool temperature is at the set point. If the tool temperature has deviated from the tool temperature set point, then the control program moves to item 42. In item 42, the control program modifies a control parameter N (which in this case is the first control parameter because it is the first time through the loop.

The next step at item 44 is to determine if the control parameter has been modified such that its value has reached a minimum or maximum value. IF the minimum or maximum value has not been reached, then the control program goes back to item 40 to determine if the tool has returned to the set point temperature. If not, the control parameter is again modified in item 42, and the control program determines if a boundary has been reached in item 44. If a boundary is reached, then that control parameter can no longer be modified. The next step is to proceed to item 46 and to increment to the next control parameter to be modified. The control program then returns to item 40 and again determines if the tool has returned to the set point temperature.

The method above is continued until a steady state tool temperature is achieved, the friction stir welding process has been completed, or all of the control parameters have been modified until reaching a boundary. At this point, the control program can either automatically stop the friction stir welding operation in order to avoid damage to the tool, or allow the user to determine if friction stir welding should proceed despite exceeding the tool temperature set point.

The nested control loops can utilize any number of control parameters that can be modified by the control program of the friction stir welding machine. For example, it is possible to modify the control parameters of Z axial load, Z axial position, traverse speed, traverse load and tool RPM or rotational speed in order to modify the tool temperature set point. However, other friction stir welding machines might be capable of controlling other aspects of the friction stir welding process. Therefore, all controllable parameters should be considered to be within the scope of the present invention.

Another aspect of the present invention is the order in which the control parameters can be modified by the control program. A user can select the order in which the control parameters are utilized in order to obtain the desired friction stir welding results.

The control program can also be modified to control more than one control parameter at a time. Thus, it may be desirable to modify two control parameters simultaneously. Once one of these control parameters has reached a parameter boundary, the present invention can either stop modifying both of these control parameters and move on to another nested control loop, continue to modify the control parameter that has not reached a parameter boundary, or add a different control parameter to the control parameter that has not yet reached a parameter boundary.

Once the control program has determined that it is necessary to stop modifying both of the control parameters within the current nested control loop, the control program moves to a next nested control loop. This next nested control loop again may be comprised of modification of a single or a plurality of control parameters. What is important to remember is that the total number of control parameters that can be modified by the control program, and the total number of control parameters that can be modified simultaneously is not limited by the present invention.

The following is an example of how a first embodiment of the present invention can be implemented using a total of four nested control loops, wherein each nested control loop enables modification of a single control parameter at a time. A tool temperature set point is assigned the value of 750° C. A maximum and minimum allowable tool temperature set point is created. The tool temperature set point does not need to be an equal distance from the boundary values. However, for this example, the tool temperature set point is +/−5° C. It should be remembered that the tool temperature set points used in this example are for illustration purposes only, and should not be considered limiting. Thus, the tool temperature set point boundaries can be greater and smaller than the values given. Thus, if the tool temperature begins to increase, the control program makes adjustments to a control parameter in order to bring the temperature of the tool back to 750° C. For this example, the first control parameter that the control program will modify is tool RPM.

The control program will be given a set point range that it can use to modify the tool RPM. For example, the control program might be given the ability to modify tool RPM by +/−25 RPM. While making changes to the tool RPM, the tool temperature is monitored to determine if it is changing in the desired direction. However, if the tool RPM reaches a maximum set point, then the control program will move to a next dependent variable or control parameter in order to achieve the desired change in tool temperature.

In this example, the control program next uses the traverse speed. The traverse speed would be increased or decreased within a traverse set point range until either a maximum or minimum set point is reached, or the tool temperature returns to the tool temperature set point.

If the tool temperature continued to rise then the Z axial load would then be reduced. If the control program has still not reached the desired tool temperature set point after a boundary value is reached for the Z axial load, then the control program would move to the final nested control loop wherein the final control parameter could be adjusted. Thus, the control program would modify the Z axial position within the minimum and maximum set points.

It is desirable during operation of the friction stir welding machine that all set points are displayed in a status window that can show all the control parameters and the minimum and maximum set points for each.

In an alternative embodiment of the present invention, the minimum and maximum set points for each control parameter can be modified on the fly. It may be necessary for an operator to thus override the control program and either allow a boundary to be exceeded, or to modify the value of the boundary so that the control program is still operating normally because the boundary has not been reached.

In another alternative embodiment, it may be desirable to change the order in which the control parameters are nested while the control program is being used. This will allow the user to modify the control parameter that is most advantageous.

Implementation of the control program has resulted in the process of friction stir welding to become a "push button" operation with no or minimal operator intervention. The tool experiences the same thermal and mechanical loading within specified control windows during every repeated weld sequence and the weld quality has improved. Analysis has shown that flow stresses and tool loads are driven by tool temperature, and that dependent control loops can account for differences in workpiece material and the amount of heat that is transferred at different rates in varying locations throughout the weld.

The order in which the control program modifies the control parameters will typically be different for different workpiece materials. A catalog of control parameters boundaries and the order in which the control parameters are applied thus becomes part of a database that is accessible to the operator. Thus, no specific control parameter order is being stated by the present invention. The nested control loops are thus applied in the most advantageous order as determined by experimentation. Nevertheless, the operator is also given the freedom to override any preset control parameter values and the order in which the control parameters are applied in order to achieve a steady state tool temperature.

An additional control feature of the present invention is to take into account the time required for the tool temperature to reach a steady state. This is referred to as predictive temperature control at the beginning of the weld sequence and is utilized until the tool has reached steady or near steady state conditions. Predictive temperature control can also be used for determining the time required for the tool to respond to a temperature change during FSW. A temperature profile can thus be determined for the tool itself and the "lag" time is accounted for in the programming for a specific tool's thermal capacitance.

The concepts of the present invention not only apply to FSW but also to any other applications that modify material properties using a rotating tool.

The embodiments above are directed to general aspects of using nested control loops to modify the tool temperature set point. However, there are other aspects that can and should be considered when trying to reach the tool temperature set point.

First, the control parameters do not need to be nested in order to take advantage of the principles of the embodiments of the present invention. A single un-nested control parameter can be used and still considered to be within the scope of the present invention.

Next, predictive temperature control does not take into account a long lag time or "Dead Band" between the change in the control parameter and the resultant change in the tool temperature or the weld temperature. Accordingly, it is useful to calculate a rate of change in the tool or weld temperature. This calculated rate of change can then be used to calculate the amount of time until the tool temperature reaches the desired tool temperature or weld temperature set point. If the rate of change is not fast enough, then it can be altered by again adjusting one or more control parameters.

Next, the embodiments above have assumed that the tool is being operated while traversing the workpiece. However, it should be remembered that there is a "plunge" or "engage" phase when the tool and the weld are heating up before the tool is plunged into the work piece and begins to traverse the weld during the "welding" or "traverse" phase. It is desirable to control the tool temperature during the engage phase in order to ensure that the traverse phase is going to run at a desired tool and/or weld temperature prior to traversal of the weld.

It was previously mentioned in general that tool RPM can be used to adjust tool temperature. However, more precise control over tool RPM during a very specific phase of FSW is also useful. Specifically, in the very beginning or initial stage of the traverse phase when the tool temperature and the weld have reached a desired temperature and the tool has plunged into the work piece, it is common practice to cause a sudden drop in tool RPM in order to counteract a rapid thermal build-up in the weld that results in temperature overshoot of the tool and/or the weld. This sudden drop in tool RPM typically results in a significant amount of time and/or distance that the tool will travel as the tool RPM is adjusted and then readjusted until a desired weld temperature set point is reached.

Accordingly, in another embodiment of the present invention, it is useful to use a "control parameter ramp profile". A control parameter ramp profile describes how a control parameter is changed as a tool and/or weld temperature set point is being approached. In other words, the increments that a control parameter can be changed do not have to be static but can instead dynamically change based on a rate that a set point temperature is being approached. Furthermore, the increments that a control parameter can be changed can be discrete steps or a continuous change. The control parameter ramp profile is likely to describe a profile that is non-linear in nature, allowing a more controlled approach to a temperature set point of a tool or weld.

In this example, a "proportional ramp-down profile" will be used when controlling tool RPM at the initial phase of welding. In other words, when the weld is approaching a desired temperature, instead of drastically dropping the tool RPM, the proportional ramp-down profile for the tool RPM is used to decrease tool RPM before the actual desired weld temperature set point is ever reached. The result is that the weld temperature may or may not reach the desired temperature more slowly because the tool RPM has been decreased. However, what is assured is that by decreasing tool RPM and thereby slowing the heating of the weld, there is less likely to be the more undesirable aspect of weld temperature set point overshoot, and the weld will likely take a shorter amount of time and/or distance to reach it.

The proportional aspect of the profile is in reference to the relative changes that are made in a control parameter as a function of how fast a temperature set point of either a tool and/or a weld is being approached. For example, consider a weld temperature set point of X. Speaking in relative terms, assume that the weld temperature is approaching set point X rapidly. When the weld temperature is within a predetermined number of degrees of the desired welding temperature set point, the control system can be programmed to decrease the tool RPM by a certain number A of RPMs. As the weld temperature continues to rise but more slowly now, the control system can be programmed to incrementally decrease the tool RPM by a number B of RPMs, where B is either larger or smaller than A.

This process of changing the tool RPM as the weld temperature approaches closer and closer to the desired weld temperature set point can be done incrementally in abrupt steps or it can be done more smoothly. In other words, the changes in tool RPM can be done in discrete steps or continuous changes, depending upon the capabilities of the FSW equipment.

An important aspect of the present invention is that control parameter ramp profiles can be used when adjusting any control parameter, and not just tool RPM. Accordingly, Z axial load, Z axial position, traverse speed, traverse load, tool RPM and any other controllable FSW parameter are all control parameters that can be more precisely controlled using a control parameter ramp profile approach in order to avoid undesirable temperature overshoots.

Another aspect of the invention is the nature of the control parameter ramp profile itself. While the proportional ramp-down profile has been described, it should be understood that other control parameter ramp profiles include, but should not be considered as limited to "exponential" and an "S curve" profile. The control parameter ramp profile is thus selected based on the control parameter that is being controlled, the nature of the work piece, etc. It is likely, however, that the control parameter ramp profile is going to be non-linear.

Figure 5:
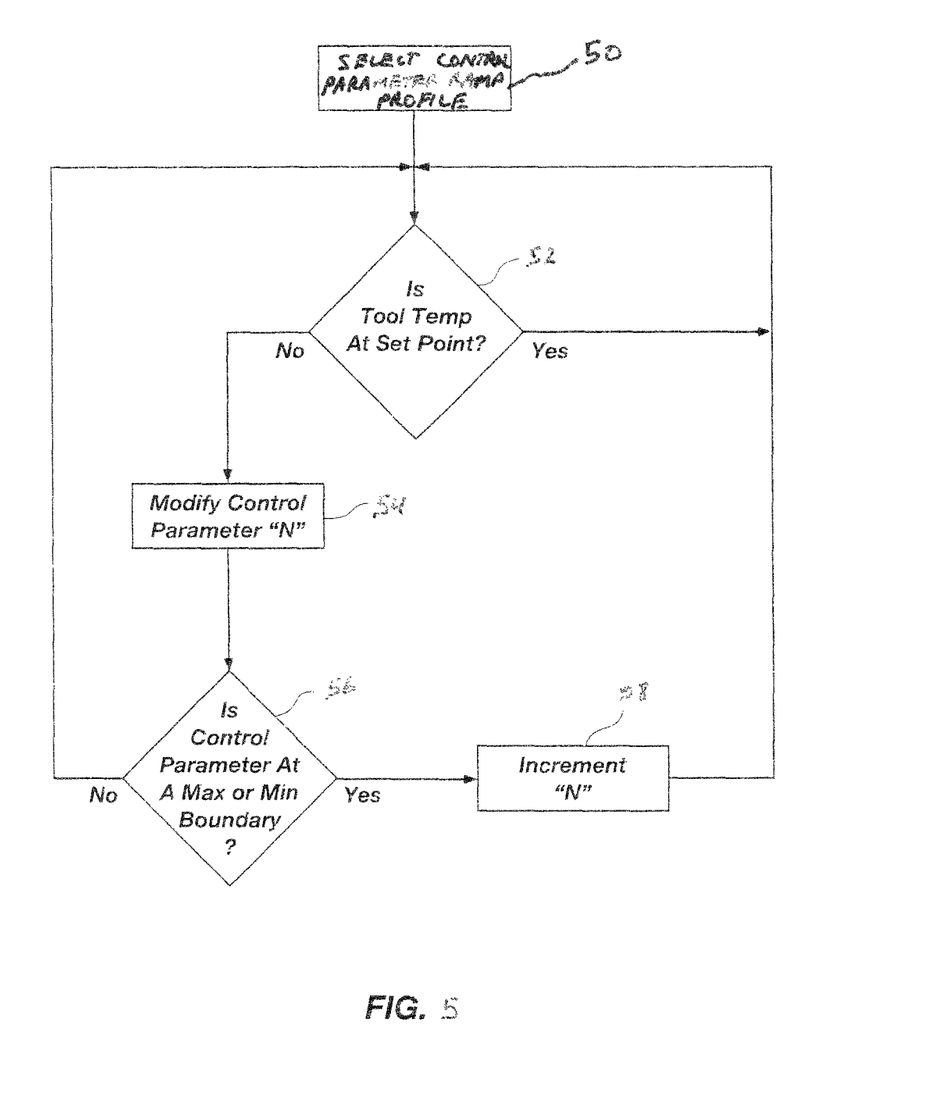
FIG. 5 is a flowchart of a method for using a control parameter ramp profile to enable a controlled approach to a temperature set point of a tool or weld that prevents temperature overshoot.

FIG. 5 is provided as a summary of the process to be followed by the control program when a single control parameter can be modified at any given time when using a control parameter ramp profile. After beginning, the control program selects a control parameter ramp profile in step 50 that is appropriate for the particular control parameter being controlled. The control program then determines if the weld is at the desired set point temperature in step 52. If it is, the control program loops back to the same step and continues to query the friction stir welding machine if the weld temperature is at the set point. If the weld temperature has deviated from the weld temperature set point, then the control program moves to item 54. In step 54, the control program modifies a control parameter N (which in this case is the first control parameter because it is the first time through the loop.

The next step 56 is to determine if the control parameter has been modified such that its value has reached a minimum or maximum value. If the minimum or maximum value has not been reached, then the control program goes back to step 52 to determine if the weld has reached the set point temperature. If not, the control parameter is again modified in step 54, and the control program determines if a boundary has been reached in step 56. If a boundary is reached, then that control parameter can no longer be modified. The next step 58 is to increment the next control parameter to be modified. The control program then returns to step 52 and again determines if the weld has returned to the set point temperature.

The method above is continued until a steady state weld temperature is achieved, the friction stir welding process has been completed, or all of the control parameters have been modified until reaching a boundary. At this point, the control program can either automatically stop the friction stir welding operation in order to avoid damage to the weld, or allow the user to determine if friction stir welding should proceed despite exceeding the weld temperature set point.

What is important to remember is that as the control parameter is modified, it is done so according to a non-linear ramp profile that enables the weld temperature set point to be approached in a controlled manner that will minimized the chances that the weld temperature set point will be overshot, and potentially damaging the weld.

It is to be understood that the above-described arrangements and embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for modifying control parameters of a friction stir welding machine being used with high melting temperature materials and being operated by a control program, and comprising the steps of:
   1) selecting a control parameter ramp profile that enables a tool temperature to reach a tool temperature set point without overshooting it;
   2) determining a temperature of a friction stir welding tool being used on high melting temperature workpiece materials selected from the group of high melting temperature materials comprised of metal matrix composites, ferrous alloys, non-ferrous materials, superalloys and titanium;
   3) comparing the tool temperature to the tool temperature set point;
   4) modifying a current control parameter according to the control parameter ramp profile if the tool temperature is not the same as the tool temperature set point, or returning to step 1) if the tool temperature is the same; and
   5) determining if a minimum or maximum boundary value of the current control parameter has been reached, and either returning to step 2) if the minimum or maximum boundary value of the current control parameter has not been reached or proceeding to a next control parameter if the current control parameter has reached the maximum or the minimum boundary value.

2. The method as defined in claim 1 wherein the method further comprises the steps of:
   1) changing the current control parameter to a next control parameter that is being modified if the current control parameter has reached the minimum or the maximum boundary value; and
   2) returning to step 1) and repeating all the steps but making the next control parameter the current control parameter being used to modify the tool temperature.

3. The method as defined in claim 2 wherein the method further comprises terminating the control program when all of the control parameters have reached a minimum or a maximum boundary value.

4. The method as defined in claim 2 wherein the control parameter is selected from the group of control parameters comprised of Z axial load, Z axial position, traverse speed, traverse load, and tool RPM.

5. The method as defined in claim 2 wherein the method further comprises the step of interrupting the control program and substituting a different control parameter for the current control parameter being used to modify the tool temperature.

6. The method as defined in claim 2 wherein the method further comprises the step of interrupting the control program to change the order in which the control parameters are used to modify the tool temperature.

7. The method as defined in claim 1 wherein the method further comprises the step of modifying at least a second control parameter simultaneously with the current control parameter such the control program is using at least two control parameters to reach the tool temperature.

8. The method as defined in claim 1 wherein the method further comprises the step of modifying the minimum or the maximum boundary value of the current control parameter on-the-fly.

9. The method as defined in claim 1 wherein the method further comprises the step of delaying steps 3) and 4) using predictive temperature control until the tool temperature has reached the tool temperature set point for a first time.

10. The method as defined in claim 1 wherein the control parameter ramp profile is selected from the group of ramp profiles comprised of proportional, exponential and S-Curve profiles.

11. A method for improving repeatability of a weld achieved through friction stir welding by modifying control parameters of a friction stir welding machine being operated by a control program, said control program comprising the steps of:
    1) selecting a control parameter ramp profile that enables a tool temperature to reach a tool temperature set point without overshooting it;
    2) determining a temperature of a tool;
    3) comparing the tool temperature to the tool temperature set point;
    4) modifying a current control parameter if the tool temperature is not the same as the tool temperature set point, or returning to step 1) if the tool temperature is the same; and
    5) determining if a minimum or maximum boundary value of the current control parameter has been reached, and returning to step 1) if the minimum or maximum boundary value of the current control parameter has not been reached or proceeding to a next control parameter if the current control parameter has reached the maximum or the minimum boundary value.

12. A method for modifying control parameters of a friction stir welding machine being used with high melting temperature materials and being operated by a control program, and comprising the steps of:
    1) selecting a control parameter ramp profile that enables a weld temperature to reach a weld temperature set point without overshooting it;
    2) determining a temperature of a weld in high melting temperature workpiece materials selected from the group of high melting temperature materials comprised of metal matrix composites, ferrous alloys, non-ferrous materials, superalloys and titanium;
    3) comparing the weld temperature to a weld temperature set point;
    4) modifying a current control parameter according to the control parameter ramp profile if the weld temperature is not the same as the weld temperature set point, or returning to step 1) if the weld temperature is the same; and
    5) determining if a minimum or maximum boundary value of the current control parameter has been reached, and either returning to step 2) if the minimum or maximum boundary value of the current control parameter has not been reached or proceeding to a next control parameter if the current control parameter has reached the maximum or the minimum boundary value.

13. The method as defined in claim 12 wherein the method further comprises the steps of:
    1) changing the current control parameter to a next control parameter that is being modified if the current control parameter has reached the minimum or the maximum boundary value; and
    2) returning to step 1) and repeating all the steps but making the next control parameter the current control parameter being used to modify the weld temperature.

14. The method as defined in claim 12 wherein the control parameter ramp profile is selected from the group of ramp profiles comprised of proportional, exponential and S-Curve profiles.

* * * * *